(12) United States Patent
Kim et al.

(10) Patent No.: US 10,440,976 B2
(45) Date of Patent: Oct. 15, 2019

(54) METHOD FOR PREPARING COATED, WHOLE COTTONSEED FROM WHICH GERMINATION FUNCTION IS REMOVED

(71) Applicants: Egreen Co., Ltd., InCheon-si (KR); Young Il Kim, Chungju-si (KR); Jong Moon Park, Yongin-si (KR)

(72) Inventors: Young Il Kim, Chungju-si (KR); Jong Moon Park, Yongin-si (KR)

(73) Assignee: Egreen Co., Ltd., InCheon-si (KR)

( * ) Notice: Subject to any disclaimer, the term of this patent is extended or adjusted under 35 U.S.C. 154(b) by 332 days.

(21) Appl. No.: 15/316,181

(22) PCT Filed: Jun. 1, 2015

(86) PCT No.: PCT/KR2015/005459
§ 371 (c)(1),
(2) Date: Dec. 5, 2016

(87) PCT Pub. No.: WO2015/186935
PCT Pub. Date: Dec. 10, 2015

(65) Prior Publication Data
US 2017/0196241 A1 Jul. 13, 2017

(30) Foreign Application Priority Data
Jun. 3, 2014 (KR) .................. 10-2014-0067744
Feb. 4, 2015 (KR) .................. 10-2015-0017366

(51) Int. Cl.
| A23K 50/10 | (2016.01) |
| A23K 40/35 | (2016.01) |
| A23K 10/30 | (2016.01) |
| A23K 20/10 | (2016.01) |
| A23K 40/00 | (2016.01) |
| A23K 40/30 | (2016.01) |

(52) U.S. Cl.
CPC ............. *A23K 50/10* (2016.05); *A23K 10/30* (2016.05); *A23K 20/10* (2016.05); *A23K 40/00* (2016.05); *A23K 40/30* (2016.05); *A23K 40/35* (2016.05)

(58) Field of Classification Search
CPC ........ A23K 50/10; A23K 40/00; A23K 40/30; A23K 40/35; A23K 10/30; A23K 20/10
See application file for complete search history.

(56) References Cited

U.S. PATENT DOCUMENTS

| 2,744,824 A | * | 5/1956 | Lent ................. | A23K 50/10 |
| | | | | 426/285 |
| 5,204,102 A | * | 4/1993 | Coles ................. | A23K 40/30 |
| | | | | 424/442 |
| 5,750,466 A | * | 5/1998 | Wedegaertner ....... | A01C 1/06 |
| | | | | 504/100 |

FOREIGN PATENT DOCUMENTS

| JP | 01-252256 | 10/1989 |
| JP | 04-063549 | 2/1992 |
| JP | 05-041953 | 2/1993 |
| KR | 10-1337883 | 12/2013 |
| WO | WO 2015/186935 | 12/2015 |

OTHER PUBLICATIONS

Bernhard J Dairy Sci. vol. 82, pp. 1305-1309, 1999 (Year: 1999).*
A. Arieli. Aninn. Feed Sci. & Technol. vol. 72, pp. 97-110, 1998 (Year: 1998).*
International Search Report and the Written Opinion dated 17 Jul. 2015 From the Korean Intellectual Property Office Re. Application No. PCT/KR2015/005459 and Its Translation of Search Report Into English. (10 Pages).

* cited by examiner

*Primary Examiner* — C. Sayala

(57) ABSTRACT

The present invention relates to a method of preparing high-strength coated whole cottonseed for livestock feed, wherein the germination ability of whole cottonseed is removed using high-temperature and high-pressure steam, and the surface of whole cottonseed is coated with gelatinized starch with high viscosity, which is prepared by gelatinizing starch in a preparation process. According to the method of the present invention, since the germination ability of whole cottonseed is removed, release of foreign genes into the domestic environment, which may occur when using whole cottonseed for livestock feed, may be fundamentally prevented, and thus the method of the present invention may contribute to protection of domestic plant genetic resources. In addition, the use of gelatinized starch with increased viscosity, which is prepared by gelatinizing starch in a preparation process, may dramatically increase the selection range of coating agents. Furthermore, since coated whole cottonseed can be prepared without a drying process, which consumes a large amount of energy, the method of the present invention may increase economic effect by resolving economic problems, such as high production costs, encountered when preparing whole cottonseed for livestock feed.

16 Claims, No Drawings

METHOD FOR PREPARING COATED, WHOLE COTTONSEED FROM WHICH GERMINATION FUNCTION IS REMOVED

RELATED APPLICATIONS

This application is a National Phase of PCT Patent Application No. PCT/KR2015/005459 having International filing date of Jun. 1, 2015, which claims the benefit of priority of Korean Patent Application Nos. 10-2014-0067744 filed on Jun. 3, 2014, and 10-2015-0017366 filed on Feb. 4, 2015. The contents of the above applications are all incorporated by reference as if fully set forth herein in their entirety.

FIELD AND BACKGROUND OF THE INVENTION

The present invention relates to a method of removing the germination ability of whole cottonseed, which is widely used as feed for ruminants, and coating whole cottonseed using gelatinized starch, which is prepared by gelatinizing starch in a preparation process, and more particularly, to a method of preparing whole cottonseed for livestock without a drying process, wherein the germination ability of the whole cottonseed is removed using high-temperature steam, and, simultaneously, the surface of the whole cottonseed is coated with gelatinized starch with high viscosity to have high strength, wherein the gelatinized starch is prepared by gelatinizing starch added as a coating agent.

[Reference 1] Arieli, A. 1998. Whole cottonseed in dairy cattle feeding: a review. Animal Feed Science and Technology. 72 (1-2): 97-110.

[Reference 2] Moreira, V. R., Satter, L. D. and Harding, B. 2004. Comparison of Conventional Linted Cottonseed and Mechanically Delinted Cottonseed in Diets for Dairy Cows. Journal of Dairy Science. 87:131138.

[Reference 3] Beranrd, J. K. 1999, Performance of Lactating Dairy Cows Fed Whole Cottonseed Coated with Gelatinized Corn starch. Journal of Dairy Science. 82:1305-1309.

[Reference 4] ISAAA, 2011. International Service for the Acquisition of Agri-biotech Applications (www(dot)isaaa(dot)org).

[Reference 5] Inkyu Han. 1991. Feeds & Nutrition, Korean Society of Animal Nutrition and Feedstuffs, SUN JIN Media group.

[Reference 6] Korean Patent No. 10-1337883

[Reference 7] Lai H M. 2001. Effects of hydrothermal treatment on the physicochemical properties of pregelatinized rice flour. Food Chem 72:455-463.

[Reference 8] Khan, N. U., K. B. Marwat, G. Hassan, Farhatullah, S. Batool, K. Makhdoom, W. Ahmad and H. U. Khan., 2010. Genetic variation and heritability for cotton seed, fiber and oil traits in *GOSSYPIUM HIRSUTUM* L. Pak. J. Bot., 42 (1):615-625.

[Reference 9] Booyong Lee, Chulkyun Mok, Chulho Lee. 1993. Comparison of differential scanning calorimetry with enzymatic method for the determination of gelatinization degree of cornstarch. Korean J. FOOD SCI. TECHNOL. Vol. 25:400-403.

[Reference 10] Wang, S. S., Chiang, W. C., Yeh, A. I., Zhao, B. L. and Kim, I. H. 1991. Experimental analysis and computer simulation of starch-water interaction during phase transition. J. Food Sci., 56:121.

Whole cottonseed is a seed left after removal of long fibers, i.e., lint, from the cotton, and the surface of whole cottonseed may be surrounded by any remaining lint. As a source of feed for livestock, whole cottonseed has good palatability, and has a high energy value of 2.3 MCal NEI/kg and high levels of nutritive components, e.g., about 15 to 17% fat, 15 to 21% protein, 85 to 90% total digestible nutrients (TDN), and 24% crude fiber (26 to 31% ADF), and the like, and furthermore, lint, which is almost pure cellulose and surrounds cottonseed, can be 100% digested by ruminal microorganisms. Therefore, whole cottonseed has a great value as a source of feed for livestock (see Arieli, A. 1998. Whole cottonseed in dairy cattle feeding: a review. Animal Feed Science and Technology 72 (1-2): 97-110).

Since both energy content and crude fiber content of whole cottonseed are high, whole cottonseed is very useful in increasing milk yield and maintaining the normal milk fat percentage of dairy cows, and a quantity of whole cottonseed is used during the late fattening period of fattening cattle, during which energy intake is increased. Particularly, since vegetable fat existing in the interior of whole cottonseed is protected by a seed coat surrounding whole cottonseed, breakdown of vegetable fat occurs not in the ruminant stomach but in the small intestine of ruminants, and this dissolved fat is absorbed into the small intestine. Thus, whole cottonseed has excellent energy efficiency.

Gene-related technologies have been being applied to agriculture to secure food resources along with increase in world population. Cultivation of living modified organisms (LMO) is increasing globally, and LMO cotton occupies 15.4% of the cultivated area of total LMO crops (see International Service for the Acquisition of Agri-biotech Applications (ISAAA), 2011. www(dot)isaaa(dot)org). Although, on the basis of the amount of crops, LMO corn is first among LMO crops imported into the domestic market, LMO cottonseed is the second most imported LMO crop, and the amount of imported LMO cottonseed is about 130,000 tons as of 2011 (see Korea biosafety clearing house, 2011. www(dot)biosafety(dot)or(dot)kr). In addition, since LMO cottonseed imported for feed has the ability to germinate, modified genes may be unintentionally exposed to the domestic environment. Accordingly, LMO-related Korean laws restrict feed manufacture using LMO cottonseed and the distribution process of LMO cottonseed so that revitalization of the feed industry may be constrained. Therefore, development of technology for inhibiting germination ability in a feed production process may greatly contribute to advancement of the domestic feed industry, and furthermore, fundamentally prevent unintended release of foreign genes into the domestic natural environment.

In the cotton industry, long fibers, i.e., lint, are stripped from the cotton, and the fibers are then processed into a final product. Although most of lint, which surrounds the surface of cottonseed, is separated from cottonseed in a process, such as ginning, the lint is not completely separated therefrom. Accordingly, whole cottonseed, which is the seed left after a ginning process and is used as feed for domestic animals, has a certain amount of lint adhered to the seed coat as well as seed enclosed in a hard seed coat (see Beranrd, J. K. 1999, Performance of Lactating Dairy Cows Fed Whole Cottonseed Coated with Gelatinized Corn starch. Journal of Dairy Science. 82:1305-1309. Such lint adhered to the surface of whole cottonseed tangles and easily agglomerates, and thus lint makes it difficult for whole cottonseed to be transferred and to be mixed with other feed or causes separation phenomenon in a feed preparation process, and furthermore, can aggravate a working environment by generating dust (Moreira, V. R., Satter, L. D. and Harding, B. 2004. Comparison of Conventional Linted Cottonseed and Mechanically Delinted Cottonseed in Diets for Dairy Cows. Journal of Dairy Science. 87:131138). Whole cottonseed distributed domestically is imported from America and Australia, and a proportion of lint to whole cottonseed is about 12.8% (w/w) in the case of whole cottonseed made in America and about 7.5% (w/w) in the case of whole cottonseed made in Australia. In addition, the method of coating whole cottonseed while minimally removing lint which has excellent nutritional value may be an important means to improve the availability of whole cottonseed and resolve various problems encountered when using whole cottonseed for feed.

SUMMARY OF THE INVENTION

The present inventors have developed a method of coating whole cottonseed using a mixture, in which gelatinized starch and lignosulfonate as binding agents are mixed in proper proportions (see Korean Patent No. 10-133788; PRODUCTION METHOD OF COATED WHOLE COTTONSEED FOR ANIMAL FEED USING BINDER). However, since gelatinized starch, which is used as a binding agent in the above method, has sticky properties upon being mixed with water, gelatinized starch tends to tangle and agglomerate rather than to uniformly mix with whole cottonseed during coating, and this phenomenon leads to a decline in production efficiency. Moreover, gelatinized starch costs more than twice as much as general starch, which leads to an increase in production costs, and thus it may be uneconomical to produce gelatinized starch. In addition to the economic problem, the above method has a drawback in that selection of coating agent type is limited.

However, the method of removing the germination ability of whole cottonseed, the method of using gelatinized starch after gelatinization of starch including starch extracted from cereals in a preparation process, and the method of using delinted whole cottonseed after removal of a proper amount of lint from whole cottonseed to increase coating efficiency are not disclosed in any of the references described above.

Therefore, the present invention has been made in view of the above problems, and it is an object of the present invention to provide a method of removing the germination ability of whole cottonseed after removing a proper amount of lint adhered to whole cottonseed, and, at the same time, coating lint adhered to whole cottonseed using a coating agent with a high viscosity, i.e., gelatinized starch, wherein gelatinized starch is prepared by gelatinizing starch including starch extracted from cereals, which have been added as a coating agent, to improve viscosity thereof in a coating treatment process.

According to the method of the present invention, problems arising in use of whole cottonseed as a raw material in formula feed preparation factories may be solved by (1) fundamentally preventing release of foreign genes into the environment, which can be carried by whole cottonseed germinated during distribution and preparation processes; (2) improving economic efficiency through a reduction in production costs, which is accomplished by preparing high-strength coated whole cottonseed without a drying process using gelatinized starch as a coating agent, wherein gelatinized starch is prepared by gelatinizing cheap starch including starch extracted from cereals, in a coating treatment process; and (3) finally using a method of preparing coated whole cottonseed, the germination ability of which is removed, whereby physical properties of lint with a tendency to tangle on the surface of whole cottonseed are eliminated.

The present invention was completed through identifying that when whole cottonseed is coated after removal of a proper amount of lint from whole cottonseed, coating efficiency increases; release of foreign genes into the environment is fundamentally prevented by removing the germination ability of whole cottonseed; improvement in economic and coating efficiency is accomplished by using a gelatinized starch, i.e., a coating agent, with a high viscosity, which is prepared by gelatinizing general starch including starch extracted from cereals, in a process of preparing coated whole cottonseed; product costs are reduced through preparing coated whole cottonseed without a drying process; and improvement in applicability of whole cottonseed to a formula feed preparation process is accomplished by removing physical properties of lint with a tendency to tangle on the surface of whole cottonseed, which is done by coating lint adhered to the surface of whole cottonseed.

One aspect of the present invention provides a method of preparing coated whole cottonseed without a drying process, wherein coating efficiency is improved by removing a proper amount of lint from the surface of whole cottonseed, the germination ability of whole cottonseed is removed, and gelatinized starch, which is prepared by gelatinizing starch including starch extracted from cereals, is used as a coating agent in a preparation process.

In particular, the present invention provides a method of preparing high-strength coated whole cottonseed for livestock feed without a drying process, wherein the method includes a step of removing lint adhered to whole cottonseed using a lint remover, a step of removing the germination ability of whole cottonseed using steam, and a step of improving the viscosity of a coating agent by gelatinizing the coating agent in a preparation process.

More particularly, the present invention provides a method of preparing coated whole cottonseed for livestock feed, the method including (1) Step 1 of removing lint from whole cottonseed; (2) Step 2 of preparing a mixture by adding a coating agent and purified water to whole cottonseed, followed by mixing; (3) Step 3 of removing the germination ability of whole cottonseed by spraying high-temperature and high-pressure steam into the mixture while agitating the mixture, and preparing coating agent-bound whole cottonseed by gelatinizing the mixed coating agent; and (4) Step 4 of cooling the coating agent-bound whole cottonseed without a drying process.

In Step 1 of the method, the whole cottonseed may be whole cottonseed imported from Australia, America, China, India, Pakistan, Brazil, Turkey, Uzbekistan, Greece, and Vietnam or domestic whole cottonseed. In addition, the lint may be finally removed to an amount of 1 to 10% by weight, preferably 1 to 5% by weight, based on the weight of the whole cottonseed.

In Step 2 of the method, the coating agent may be one or more selected from the group consisting of starch including molasses, cornstarch, tapioca starch, wheat starch, rice starch, potato starch, and the like; cereals including saccharides, corn flour, tapioca flour, wheat flour, rice flour, and the like; and cellulose, or one or more selected from the group consisting of combinations thereof.

In Step 2, an amount of 1 to 20% by weight, preferably 3 to 10% by weight, of the purified water based on the weight of the whole cottonseed may be added and mixed to increase coating strength. More specifically, in Step 2, i.e., in the step of mixing the whole cottonseed with the purified water, the purified water is used for the purpose of preparing the center of the seed for processing by the following processes of the present invention. In other words, by adding the purified water to the whole cottonseed and mixing the same, lint adhered to the seed is impregnated with the purified water, and, after a certain period of mixing, tangled and agglomerated lint is easily separated, so that the center of the seed is exposed. In addition, the purified water is added to be used in the following process, in which starch is gelatinized using high-temperature steam. When a proportion of the purified water to the whole cottonseed is below the range described above, lint is not easily separated, and thus coating efficiency decreases and gelatinization is not properly accomplished, whereby coating strength decreases. On the other hand, when the percentage of the purified water is above the range described above, a drying process is additionally required, and thus it may be economically infeasible.

In Step 2, an amount of 0.01 to 30% by weight, preferably 0.1 to 10% by weight, of the coating agent based on the weight of the whole cottonseed may be added. Here, the addition amount of the coating agent may be different according to the kinds of general coating agents. For examples, based on the weight of the whole cottonseed, an amount of 1 to 5% by weight of starch, an amount of 0.5 to 2% by weight of saccharides, and an amount of 2 to 6% by weight of cereals may be used. However, when at least one or more coating agents are mixed, an addition amount may be adjusted. In the above method, with respect to a method of adding the coating agent, the coating agent may be equally aliquoted into several portions, preferably two or twenty portions, more preferably two to five portions in an amount of about 1/100 to 1/5 (w/w), preferably about 1/50 to 1/10 (w/w), based on a total addition amount of the coating agent, and then continuously added while stirring.

The method of adding the coating agent of the present invention is a very important factor in maximizing the effect of the present invention, and thus, for the purpose of uniformly dispersing the coating agent, the coating agent is preferably aliquoted into several portions and then added. When the coating agent is uniformly dispersed on and bound to the surface of cottonseed, which has absorbed moisture, coating effect is high and a use amount of the coating agent is reduced, and thus economic effect may increase. It is a principle of coating that, by use of the coating agent, lint adhered to a seed coat of cottonseed is firmly attached to the seed coat and the attached lint is maintained in a certain form.

In the process of spraying high-temperature and high-pressure steam of Step 3, the mixture of the whole cottonseed and the coating agent is sprayed with high-temperature and high-pressure steam. The process is performed to remove the germination ability of the whole cottonseed and gelatinize the coating agent. The steam temperature may be 80 to 140° C., preferably 100 to 130° C., and the steam pressure may be 1 to 15 kg/cm$^2$, preferably 4 to 10 kg/cm$^2$. The time of spraying high-temperature and high-pressure steam may be 30 seconds to 10 minutes, preferably 2 to 8 minutes. When temperature and pressure of the steam are below the range described above or the spraying time is shorter than the time described above, the efficiency of removing the germination ability of whole cottonseed is reduced and the gelatinization degree of the added coating agent is lowered, which leads to reduction in the coating strength of the coated whole cottonseed.

In Step 3, the final gelatinization degree of the gelatinized coating agent is more than 50%, preferably 60 to 98%, more preferably 70 to 90%.

In Step 3, one or more selected from the group consisting of molasses, salt, monosodium glutamate (MSG), MSG by-products, saccharides (sugar, glucose, sodium saccharin), flavoring agents (vanilla flavor, strawberry flavor), volatile fatty acid, and condensed molasses fermentation solubles (CMS), preferably one or more selected from the group consisting of molasses and CMS, may added as an additive for improving the palatability of the finally prepared coated whole cottonseed. Here, the addition amount of the additive may be varied according to the kinds of general additives for improving palatability. For example, 0.1 to 10% (w/w) molasses and 0.1 to 10% (w/w) CMS may be separately added or a combination thereof may be added. However, when at least one or more additives are mixed, the addition amount thereof may be adjusted. More preferably, 0.5 to 5% (w/w) molasses and 0.5 to 5% (w/w) CMS may be added alone or as a combination thereof.

With regard to Steps 2 and 3, the process of adding purified water of Step 2 and the process of spraying high-temperature and high-pressure steam of Step 3 may be performed once or repeatedly, thereby preparing coated whole cottonseed for livestock feed.

In Step 4, the mixture is cooled without a drying process which uses heat. More particularly, the moisture content of the finally prepared coated product, i.e., coated whole cottonseed, is properly maintained without a drying process by adjusting the amount of the added purified water in Step 2, and the amount of the sprayed steam and the amount of the consumed moisture during gelatinization of starch in Step 3. More specifically, the moisture content of the finally prepared product, i.e., coated whole cottonseed, is adjusted in a range of 10 to 18%, preferably 11 to 15%. The cooling process, in which the mixture of the whole cottonseed and the coating agent is cooled using room temperature air, may be performed for 1 to 60 minutes, preferably 10 to 30 minutes.

The present invention also provides coated whole cottonseed prepared by the method of the present invention.

When compared to conventional whole cottonseed, the germination ability of the coated whole cottonseed prepared by the method according to the present invention is removed in the preparation process. As a result, release of foreign genes into the domestic natural environment may be fundamentally prevented, and thus the method of the present invention may greatly contribute to protection of domestic plant genetic resources. In addition, since, according to the present invention, physical properties of lint with a tendency to tangle on the surface of whole cottonseed are eliminated while retaining nutritional characteristics, the coated whole cottonseed of the present invention may be easily handled during measuring and mixing processes and thus applicability thereof may be improved. Moreover, the method of the present invention, in which a drying process is not required, may greatly reduce production costs.

As described above, a method of removing the germination ability of whole cottonseed and coating the same according to the present invention allows maximization of use of the nutrients of whole cottonseed itself, and also, since the germination ability of whole cottonseed is removed, the method greatly contributes to protection of domestic genetic resources by fundamentally preventing release of foreign cottonseed genes into the domestic natural environment. Administrative tasks in feed manufacturers, which are involved with LMO-related Korean laws, feed management-related laws, and the like, can be simplified through application of the method of the present invention.

In addition, production costs can be greatly reduced through development of a fundamental technology according to the present invention wherein various types of starch and various kinds of cereals can be applied as a coating agent by the process of gelatinizing the coating agent using high-temperature and high-pressure steam. Moreover, when compared to a conventional coating technology in which a drying process using high temperature is included, the method of the present invention uses a natural cooling method without a drying process using a heat source, and thus the method can reduce energy costs. Accordingly, the method is very economical. Therefore, the method of the present invention may greatly contribute to national energy conservation.

Considering all aspects, applicability of the coated whole cottonseed, the germination ability of which is removed, as a feed source can be increased, and the method of preparing the coated whole cottonseed, in which the coating agent is directly gelatinized and a drying process is not necessary, can reduce production costs and greatly contribute to development of the feed industry.

DESCRIPTION OF SPECIFIC EMBODIMENTS OF THE INVENTION

Hereafter, the present invention will be described in more detail with reference to the following examples and experimental examples. However, these examples and experimental examples are provided for illustrative purposes only and should not be construed as limiting the scope and spirit of the present invention.

Example 1. Preparation of Whole Cottonseed from which Lint is Removed

In Example 1, to prepare whole cottonseed from which lint is removed, the weight ratio of lint to whole cottonseed was first measured. Whole cottonseed used in the preparation was American (MOTU0796660, FEEDWILL, Korea) and Australian (UACU8445073, FEEDWILL, Korea) whole cottonseed.

Whole cottonseed was used in experiments after being dried in a drying oven (JSON-050, JCR, Korea) at 105° C. for 24 hours. Completely dried whole cottonseed was treated with 95% $H_2SO_4$ (DAEJUNG chemicals & metals Co. LTD, Korea) to melt lint. Here, 100 ml of $H_2SO_4$ per 1 kg of completely dried whole cottonseed was used, followed by washing with water and drying at 105° C. for 24 hours. Thereafter, the weight ratio of lint to whole cottonseed was obtained by calculating weight ratio (Khan, N. U., K. B. Marwat, G. Hassan, Farhatullah, S. Batool, K. Makhdoom, W. Ahmad and H. U. Khan., 2010. Genetic variation and heritability for cotton seed, fiber and oil traits in *GOSSYPIUM HIRSUTUM* L. Pak. J. Bot., 42 (1):615-625).

In the case of American whole cottonseed, the weight ratio of lint to whole cottonseed was about 12.8±0.4 (w/w), and in the case of Australian whole cottonseed, the weight ratio of lint to whole cottonseed was about 7.5±0.3 (w/w). The weight ratio of lint in American whole cottonseed was about 5.3% higher than in Australian whole cottonseed.

A lint remover (MR114D, SDMT, China), by which the desired amount of lint can be removed, was used in preparing whole cottonseed, from which lint is removed. When the weight ratio of lint to whole cottonseed was taken as 100, American whole cottonseed having various weight ratios of removed lint was prepared while increasing the ratio of removed lint in units of 10%. When the weight ratio of removed lint was 70% or more, the back region of the inside of whole cottonseed was exposed to the outside, and thus the whole cottonseed showed a tendency to have a black color. On the other hand, whole cottonseed, wherein the weight ratio of the removed lint was about 50%, retained the original color thereof. On the basis of the results, it was identified that the proper ratio of removed lint is about 50% by weight.

Example 2. Preparation of Whole Cottonseed, the Germination Ability of which is Removed In Example 2, to prepare whole cottonseed, the germination ability of which is removed, the following experiments were performed. Steam was applied to American whole cottonseed by means of a steam generating device (STE2600, SANG ROK Electronics, Korea). Particularly, the steam application was performed at 120° C. under a pressure of 6 kg/cm$^2$. Steam was sprayed for up to a maximum of 10 minutes while increasing a spraying time in steps of 1 minute. To measure the germination rate of each group consisting of 50 seeds, wherein each group had been treated with steam for each spraying time, as described in above experimental condition, each steam-treated group was sowed in a germination bed (120 mm×115 mm), and then cultured in an incubator (JSGI-100T, JS Research, Inc., Korea), a culture condition of which was set up as follows: 25° C. under a dark condition. Seed germination was observed and recorded every 24 hours for two weeks. In the case of a non-treated group, which had not been treated with steam, seeds began to germinate at three days after culture, and 87% of seeds germinated within two weeks. In the case of a treated group, which had been treated with steam for 1 minute, 13% of seeds germinated within two weeks. In the treated groups, which had been treated with steam for 2 or more minutes, none of the seeds germinated. Therefore, on the basis of the results, it was identified that the method, wherein whole cottonseed is treated with steam at 120° C. under 6 kg/cm$^2$ for 2 or more minutes, is suitable to prepare whole cottonseed, the germination ability of which is removed.

Example 3. Preparation of Gelatinized Starch Having Viscosity Improved by Steam Treatment Generally, when starch is heated with water, starch is gelatinized and forms colloid solution with very high viscosity, which is transparent or has an ivory white color (Booyong Lee, Chulkyun Mok, Chulho Lee. 1993. Comparison of differential scanning calorimetry with enzymatic method for the determination of gelatinization degree of cornstarch. Korean J. FOOD SCI. TECHNOL. Vol. 25:400-403).

In Example 3, cornstarch (C0022, SAMYANG Co., Korea) was used as a coating agent. To fully gelatinize cornstarch, moisture content of 65% or more is necessary (Wang, etc., 1991, Experimental analysis and computer simulation of starch-water interaction during phase transition, J. Food Sci., 56 121).

To measure gelatinization degree according to steam treatment, suspension composed of cornstarch and distilled water was prepared, wherein the weight ratio of cornstarch to purified water was 35:55 and the moisture content of the suspension was about 65%.

100 ml of a resultant starch suspension was added to a 500 ml Erlenmeyer flask having a branch at the bottom thereof, and then 120° C. steam was sprayed into the Erlenmeyer flask through the branch of the Erlenmeyer flask using a steam generating device (STE2600, SANG ROK Electronics, Korea). When spraying steam, the suspension was stirred using a magnetic stirrer inserted into the flask.

Varying a steam spraying time from 1 to up to 10 minutes, steam treatment was respectively carried out by a total of 10 steam treatment methods. As a result, variously gelatinized starch suspensions were prepared.

To measure the gelatinization degree of the variously gelatinized starch suspension samples, the starch suspension samples were subjected to rapid freezing (−70° C.), and then freeze-drying (operating conditions: −50° C., 1.33 Pa) was carried out using a freeze-drying apparatus (Ilshin Co., Korea). After powderizing each freeze-dried sample, each sample was passed through a standard sieve (100 mesh; 150 μm), to obtain solid content of a certain particle size, and then the solid content was used as a sample for measurement.

20 mg of each of the powdered samples was added into a 50 ml centrifuge tube, 5 ml of distilled water was added thereinto, and then the powdered samples were dispersed. Thereafter, 25 ml of α-amylase solution (A3306, SIGMA, USA) (20.1 units/g solid, acetate buffer, pH 4.5) was added to each of the tubes, and then incubated at 40° C. for 1 hour, and subsequently 2 ml of 25% trichloroacetic acid (204-02405, WAKO, Japan) was added to stop the reaction. The reaction product was subjected to centrifugation (16,000×g, 5 min) using a centrifugal separator (UNION32R, HANIL, Korea) to separate a supernatant, followed by measurement of gelatinization degree.

0.5 ml of supernatant was diluted with a proper amount of distilled water to achieve an absorbance at 550 nm of 0.1 to 0.9, and the diluted supernatant was added in a test tube and mixed with 1.5 ml of a DNS reagent. The mixture was incubated in boiling water for 5 minutes and subsequently placed in ice water to cool to room temperature, and then subjected to absorbance measurement at 550 nm using a spectrometer (UV-Vis spectrophotometer, S-100, SCINCO, Korea). Based on a calibration curve calculated using pure glucose (glucose, G0350500, SIGMA, USA), reducing sugar of each sample was calculated from the measured absorbance.

The ratio of reducing sugar of sample for each time period to reducing sugar of fully gelatinized cornstarch, which was prepared by the same method except for a spraying time of 30 minutes, was used to calculate specific gelatinization degree. When whole cottonseed was not treated with steam, gelatinization degree was about 26%. On the other hand, when whole cottonseed was treated with steam for 2 or more minutes under conditions of 120° C. and 6 kg/cm$^2$, gelatinization degree increased up to about 73%, and colloid was formed, which indicates that the method is suitable to improve the viscosity of gelatinized starch.

Example 4. Preparation of Coated Whole Cottonseed, the Germination Ability of which is Removed To prepare coated whole cottonseed, the germination ability of which is removed, as in Example 1, Australian whole cottonseed (UACU8445073, FEEDWILL, Korea) was delinted using a lint remover (MR114D, SDMT, China) to prepare delinted whole cottonseed, from which 2% by weight of lint was removed. With the same method as described in Example 2, the delinted whole cottonseed was treated with steam for 2 minutes under conditions of 120° C. and 6 kg/cm$^2$ using a steam generating device (STE2600, SANG ROK Electronics, Korea), thereby removing the germination ability of the whole cottonseed.

Using the same method as described in Example 3, a starch suspension having a moisture content of about 65% was prepared using cornstarch (C0022, SAMYANG Co., Korea), and then, using a steam generating device (STE2600, SANG ROK Electronics, Korea), the starch suspension was treated with steam under conditions of 120° C. and 6 kg/cm$^2$ for 2 minutes to prepare gelatinized starch with high viscosity. 100 kg of whole cottonseed, the germination ability of which was removed, was added to an agitator (DDK-801M, DAEDONG, Korea), and then 5 kg of purified water was added to the agitator, followed by agitation for 5 minutes. Thereafter, 5.7 kg of the gelatinized starch was added, and then the mixture of the whole cottonseed and the gelatinized starch was agitated for 5 minutes to prepare coated whole cottonseed, the germination ability of which had been removed.

When judging by appearance, the coated whole cottonseed was excellent in degree of binding. In addition, the moisture content of the coated whole cottonseed was measured as 13.2%. This indicates that coated whole cottonseed, the germination ability of which is removed, can be prepared without a drying process according to the method of the present invention. 100 whole cottonseeds, the germination ability of which was removed, were sowed in a germination bed (120 mm×115 mm), and then cultured in an incubator (JSGI-100T, JS Research, Inc., Korea). Here, culture conditions were set as follows: 25° C. under dark conditions. Seed germination was observed and recorded every 24 hours for two weeks. As a result, germination rate was 0%. Thus, it was verified that the germination ability of the coated whole cottonseed was removed.

Example 5. Preparation of Coated Whole Cottonseed, the Germination Ability of which is Removed, Having Improved Palatability To prepare coated whole cottonseed, the germination ability of which was removed, having improved palatability, using the same method described in Example 4, whole cottonseed, the germination ability of which was removed, and gelatinized starch were prepared. 100 kg of whole cottonseed, the germination ability of which was removed, was added to an agitator (DDK-801M, DAEDONG, Korea), and then 5 kg of purified water was added thereto, followed by agitation for 5 minutes. Thereafter, the whole cottonseed was mixed with 5.7 kg of gelatinized starch, 5 kg of molasses (D1PAM-00700, EVERMIRACLE, Korea), and 5 kg of condensed molasses fermentation solubles (CMS, SM Biotech, Korea), and then the mixture was agitated for 5 minutes to prepare coated whole cottonseed, the germination ability of which was removed, having improved palatability.

To evaluate palatability, the degree of palatability was evaluated using 10 Holstein cows. As an evaluation method, a method described in a reference was used. At 3 hours after being fed formula feed, the cows were fed whole cottonseed according to the top dressing method, wherein each cow was fed 500 g of whole cottonseed, and then the degree of palatability was investigated (Inkyu Han. 1991. Feeds & Nutrition, Korean Society of Animal Nutrition and Feedstuffs, SUN JIN Media group).

When evaluating the degree of palatability, whole cottonseed, the germination ability of which was removed, which was prepared without addition of molasses and CMS, was used as a control group. As a result, in the case of coated whole cottonseed, the germination ability of which was removed, having improved palatability, 6 cows immediately ingested the whole cottonseed, 4 cows ingested the whole cottonseed within 5 minutes, and none of the cows refused to ingest the whole cottonseed. On the other hand, in the case of whole cottonseed, the germination ability of which was removed, which was prepared without addition of molasses and CMS, 4 cows immediately ingested the whole cottonseed, 5 cows ingested the whole cottonseed within 5 minutes, and 1 cow refused to ingest the whole cottonseed. Thus, it was verified that when adding molasses and CMS, the palatability of whole cottonseed, the germination ability of which was removed, was improved.

INDUSTRIAL APPLICABILITY

As described above, a method of removing the germination ability of whole cottonseed and coating the same according to the present invention allows maximization of use of the nutrients of whole cottonseed itself, and also, since the germination ability of whole cottonseed is removed, the method greatly contributes to protection of domestic genetic resources by fundamentally preventing release of foreign cottonseed genes into the domestic natural environment. Administrative tasks in feed manufacturers, which are involved with LMO-related Korean laws, feed management-related laws, and the like, can be simplified through application of the method of the present invention.

In addition, production costs can be greatly reduced through development of a fundamental technology according to the present invention wherein various types of starch and various kinds of cereals can be applied as a coating agent by the process of gelatinizing the coating agent using high-temperature and high-pressure steam. Moreover, when compared to a conventional coating technology in which a drying process using high temperature is included, the method of the present invention uses a natural cooling method without a drying process using a heat source, and thus the method can reduce energy costs. Accordingly, the method is very economical. Therefore, the method of the present invention may greatly contribute to national energy conservation.

Considering all aspects, applicability of the coated whole cottonseed, the germination ability of which is removed, as a feed source can be increased, and the method of preparing the coated whole cottonseed, in which the coating agent is directly gelatinized and a drying process is not necessary, can reduce production costs and greatly contribute to development of the feed industry.

What is claimed is:
1. A method for manufacturing coated whole cottonseed for livestock feed without a drying process, comprising:
    (a) removing a predetermined amount of lint adhered to the whole cottonseed from whole cottonseed using a lint remover;
    (b) adding a coating agent and purified water to whole cottonseed, followed by mixing to produce a mixture;
    (c) spraying steam into said mixture while agitating said mixture, thereby disfunctioning a sprouting function of said whole cottonseed and gelatinizing the mixed coating agent, thereby producing a coating agent-bound whole cottonseed; and
    (d) cooling the coating agent-bound whole cottonseed without a drying process which uses a heat source,
    wherein said coating agent is one or more selected from the group consisting of starches, saccharides, cereals, cellulose and mixtures thereof,
    wherein said steam is sprayed at a temperature in the range of 80-140° C. and at a pressure in the range of 1-15 $kg/cm^2$,
    thereby producing coated whole cottonseed with disfunctioned germination ability.
2. The method according to claim 1, wherein said cereals are selected from the group consisting of corn flour, tapioca flour, wheat flour and rice flour.
3. The method according to claim 1, wherein said saccharides comprise condensed molasses fermentation solubles (CMS) and/or molasses.
4. The method according to claim 1, wherein in step (a), the lint is finally removed to an amount of 1 to 10% by weight based on a weight of the whole cottonseed.
5. The method according to claim 1, wherein said starch is selected from the group consisting of cornstarch, tapioca starch, wheat starch, rice starch, and potato starch.
6. The method according to claim 1, wherein said adding purified water of step (b) and said spraying steam of step (c) are performed once or repeatedly.
7. The method according to claim 1, wherein said purified water is added in an amount of 1 to 20% by weight based on a weight of the whole cottonseed, followed by mixing, so as to increase coating strength.
8. The method according to claim 1, wherein the coating agent in step (b) is added in an amount of 0.01 to 30% by weight based on a weight of the whole cottonseed.
9. The method according to claim 1, wherein in step (b), the coating agent is equally aliquoted into two to five portions in an amount of 1/100 to 1/5 (w/w) based on a total addition amount of the coating agent, and then continuously added while stirring thereby coating the whole cottonseed.
10. The method according to claim 1, wherein said steam is sprayed at a temperature in the range of 100-130° C. and at a pressure in the range of 4 to 10 $kg/cm^2$.
11. The method according to claim 1, wherein, the process of spraying steam in step (b) is performed for 30 seconds to 10 minutes.
12. The method according to claim 2, wherein, in (c), a final gelatinization degree of the gelatinized coating agent is 60 to 98%.
13. The method according to claim 1, further comprising adding a palatizing additive selected from the group consisting of molasses, salt, monosodium glutamate, monosodium glutamate by-products, saccharides (sugar, glucose, sodium saccharin), flavoring agents (vanilla flavor, strawberry flavor), volatile fatty acid, and condensed molasses fermentation solubles and mixtures thereof in step (c), thereby improving palatability of said coated whole cottonseed with disfunctioned germination ability.
14. The method according to claim 1, further comprising adjusting the moisture content of said coated whole cottonseed with disfunctioned germination ability to 11 to 15% in step (d).
15. The method according to claim 1, wherein said cooling of step (d) is performed for 1 to 60 minutes.
16. The method according to claim 1, wherein, in step (d), the moisture content of said coated whole cottonseed is maintained without a drying process by (i) adjusting the amount of the purified water added in step (b), and (ii) adjusting the amount of sprayed steam and the amount of moisture consumed during gelatinization of starch in step (c).

* * * * *

UNITED STATES PATENT AND TRADEMARK OFFICE
CERTIFICATE OF CORRECTION

PATENT NO. : 10,440,976 B2  
APPLICATION NO. : 15/316181  
DATED : October 15, 2019  
INVENTOR(S) : Young Il Kim et al.

Page 1 of 1

It is certified that error appears in the above-identified patent and that said Letters Patent is hereby corrected as shown below:

On the Title Page

Item (73) Assignee:  
After "Egreen Co., Ltd., InCheon-si (KR)" insert the following:  
-- Young Il KIM, Chungju-si (KR); Jong Moon PARK, Yongin-si (KR) --

Signed and Sealed this  
Thirtieth Day of June, 2020

Andrei Iancu  
*Director of the United States Patent and Trademark Office*